United States Patent Office 2,861,959
Patented Nov. 25, 1958

2,861,959
PROMOTED HYDROFORMING CATALYST

John P. Thorn, Elizabeth, Walter R. F. Guyer, Roselle, and Erving Arundale, Westfield, N. J., assignors to Esso Research and Engineering Company, a corporation of Delaware No Drawing. Application May 3, 1952
Serial No. 286,016

2 Claims. (Cl. 252—465)

This invention relates to the preparation of catalysts for the treatment and conversion of hydrocarbons. More specifically, it relates to the preparation of a catalyst containing small amounts of a noble metal catalyst on a promoted catalyst support.

Noble metal catalysts, including platinum, palladium, rhodium, iridium, and the like, are known to be useful for the treatment and conversion of hydrocarbons in a variety of processes involving the splitting of carbon-carbon bonds and the transfer of hydrogen. These catalysts have been used in a variety of hydrocarbon conversion treatments, and have been particularly valuable in treatments for the production of aromatics from naphthene-containing feed stocks in the naphtha boiling range. A great advantage of the use of these catalysts has been the high selectivity with which certain types of hydrocarbons, referred to collectively as "aromatic precursors" can be converted to aromatics with the minimum of side reactions.

It has recently been found that these noble metal catalysts can be employed to particular advantage on a catalyst support in which alumina is the major constituent, and the catalytic metal is present in very small amounts or even trace amounts. A variety of catalysts containing fractional percentages of platinum or palladium on an alumina-containing carrier have been found to be applicable to such processes. Thus, they may be used to convert naphtha fractions of low motor fuel value to premium quality products having a high aromatic content, and improved volatility. An important advantage of these catalysts is that the particular combination of reactions which they promote with a naphtha feed stock is such that the original low octane quality feed constituents may be almost completely removed by a combination of isomerization, dehydrogenation and cyclization reactions.

These catalysts have been particularly useful in reactions of the general type known as hydroforming. This is an operation carried out in the presence of a solid catalyst and in an atmosphere containing free hydrogen, but without a net consumption of hydrogen. In hydroforming operations, there is ordinarily a net evolution of hydrogen due to the transformation of other hydrocarbons into aromatics. The group of hydrocarbons or aromatic precursors thus transformed includes substantially all of the $C_6$ ring naphthenes, a varying proportion of the $C_5$ ring naphthenes, and a proportion of the original paraffins which varies both with operating conditions and with the content of $C_6+$ hydrocarbon chains in the paraffin molecules present.

Hydroforming reactions can be carried out at sufficiently high partial pressures that the formation of coke deposits is completely repressed. Such operations, at hydrogen partial pressures of the order of 500–1000 pounds per square inch, may result in a fairly complete conversion of the cyclohexanes in the original feed stock to the corresponding aromatics. In addition there is a certain amount of aromatics formed from other types of hydrocarbons. For a given catalyst, however, the use of high hydrogen pressures tends to increase the breakdown of the original molecular structure to lower molecular weight saturated materials by a variety of cracking, dealkylation, and re-hydrogenation reactions known collectively as hydrocracking.

Hydrocracking can be minimized, but only to a certain extent, however, by suitable variations in the composition of the catalyst.

The use of relatively low hydroforming pressures in the general range from about 50 lbs. to 500 lbs./sq. in. results in a product of higher octane quality than that produced in the higher pressure hydroforming type of operation. A substantial added advantage is realized from the fact that this improved product quality is obtained with less degradation of the feed stock to light gases and to coke than in the high pressure non-regenerative type of operation.

The difference here is caused in some degree by an increase in the activity of the catalyst toward isomerization and aromatization of the paraffins and naphthenes other than cyclohexane derivatives. At the same time, while such a lower hydrogen partial pressure does relieve the tendency toward hydrocracking, it permits certain undesirable side reactions to occur which lead to the formation of coke deposits on the catalyst. The amount of this coke formed is not great, so that the overall yield of hydroformed product in the naphtha boiling range is greater under the low pressure conditions. The amount of hydrocracking which takes place under high pressure hydroforming conditions tends to be considerably greater than the total amount of feed degradation to light gas and coke in the low pressure range of operation.

More severe treating conditions can be used in general, in any of these hydrocarbon conversion processes, to give a product of higher octane quality at the expense of a loss in gasoline yield. This loss in yield ordinarily corresponds first to a degradation to light gaseous products. The degradation of feed to coke and to heavy by-products is often an even more serious consideration, since it may result in a rapid loss in catalyst activity due to contamination of the catalyst surface. The development of new catalysts has been particularly important to the extent that it has made possible the preparation of materials of high octane quality and desirable volatility without an increase in the degradation of feed to gas, coke, and heavy liquid by-products. At the same time, it is important to develop catalysts which give the highest quality product. For many uses, such as aviation gasoline, the production of premium quality is an absolute requirement.

A serious disadvantage of the supported noble metal catalysts, of which platinum on alumina may be taken as typical, is the fact that a coked catalyst cannot ordinarily be regenerated readily with air over long periods of time without a definite loss in activity. This activity loss is so severe in many cases that it becomes completely impossible to produce a product of more than mediocre quality. An object of the present invention is to prepare a noble metal catalyst of improved regeneration characteristics.

Another object is to prepare a noble metal catalyst for the hydroforming of naphthas which will produce a product of improved octane quality with no loss in yield.

Still another object is to prepare such a catalyst on a specific type of alumina promoted by the addition of very small amounts of another hydrogenation catalyst.

More specifically, an object of the present invention is to prepare a catalyst comprising a metal of the type of platinum on a promoted alumina in which a very small amount of an hydrogenation catalyst such as a catalytic group IV or VI metal oxide or sulfide is included to promote the ability of the catalyst to be regenerated by hydrogenation.

It has commonly been assumed that the mode of action of the noble metal hydroforming catalysts and the metal oxide or sulfide catalysts commonly employed for hydrogenation or hydroforming reactions are different and in some way incompatible. Attempts have been made to modify catalysts by including an amount of molybdena which would give a very active catalyst in the absence of the platinum. The resulting composite has been found to possess the desirable characteristics of neither the platinum nor the molybdena, giving only slightly more catalytic action than that which might be attributed to the alumina base alone.

Experience has shown that with the noble metal alone as the active catalytic component, very useful results may be obtained with concentrations of the order of 0.05 to 1% or 2%, depending upon the catalytic metal being employed. Thus with platinum, catalysts containing about 0.5 wt. percent of the metal on the carrier have been found in many cases to give results which are definitely superior to those with smaller amounts of the order of 0.1 to 0.3 wt. percent, and almost as good as those produced with 1 to 5 wt. percent of the metal. With the group VI oxide type of catalyst, on the other hand, it has been found that amounts of oxide below about 6% give definitely inferior results, and concentrations of the order of 8% to 15% are ordinarily preferred when using molybdena on alumina.

The surprising result has now been found that the activity of a platinum-on-alumina hydroforming catalyst can be markedly enhanced by the presence of only trace amounts of a metal oxide or sulfide hydrogenation catalyst. This discovery has the important advantage that it permits the preparation of a product of still higher octane number without a loss in product yield. At the same time it is found that the inclusion of a small amount of the additional hydrogenation component has a definite advantage in promoting the regenerability of the catalyst by a hydrogen regeneration process.

Thus, it has been found that the activity of platinum-alumina hydroforming catalysts may be improved without impairment of selectivity by including minor amounts of molybdena. The allowable concentration of $MoO_3$ is critical, and concentrations which are considerably below those commonly employed in molybdena-alumina catalysts are already too high. The critical range is, in fact, similar to the amounts of platinum commonly employed, and is of the order of about 0.01% to less than 2.5 wt. percent on the catalyst.

The molybdena may be incorporated into the catalyst by any one of a number of methods such as impregnation, precipitation or dry mixing. Various methods can also be employed to introduce the platinum, including impregnation with solutions or sols or coprecipitation techniques. While in certain instances it may be desirable to introduce the group VIII metal into the catalyst together with the hydrogen-regeneration promoter, these components will ordinarily be added one after the other.

According to one preferred method, a platinum-alumina catalyst containing about 0.5% platinum is first prepared by impregnating a pre-dried active alumina with an aqueous solution of chloroplatinic acid. After drying, a suitable molybdenum-containing material such as ammonium molybdate, molybdic acid, or crude molybdena is added by dry mixing. The catalyst is then calcined at a temperature of the order of 900 to 1050° F. and used for the reforming operation. Alternatively, the catalyst may be reduced directly without calcination before use.

A series of platinum-on-alumina catalysts prepared in this manner with varying amounts of molybdena were used to hydroform a 200-330° F. vapor temperature heavy virgin naphtha, having a clear Research octane number of about 52. These samples were tested in parallel at a feed rate of one liquid v./v./hr., feeding six mols of hydrogen per mol of hydrocarbon at 200 p. s. i. g. and 900° F. The following data were obtained with such a series of catalysts, using an active alumina base stabilized with 5 wt. percent of silica:

| Catalyst | $C_5+$ Gasoline | | Carbon, Wt. Percent on Feed |
|---|---|---|---|
| | Clear Research ON | Yield, Volume Percent | |
| Stabilized Alumina Base, Alone | 62 | 91 | 0.20 |
| Control: 0.5% Pt on Alumina | 95.0 | 78 | 0.18 |
| Control plus 0.03% $MoO_3$ | 95.5 | 79 | 0.09 |
| Control plus 0.1% $MoO_3$ | 96.5 | 80 | 0917 |
| Control plus 0.5% $MoO_3$ | 97.5 | 71 | 0.21 |
| Control plus 2.5% $MoO_3$ | 91.5 | 73 | 0.23 |
| Control plus 9% $MoO_3$ | 71 | 90 | 0.07 |
| 0.0% Pt with 9% $MoO_3$ | 95 | 77 | 0.4 |

It may be seen quite clearly from these data that the promotional effect of very small amounts of molybdena on the platinum hydroforming catalyst gives a product which is superior to that obtained by either the platinum or the molybdena alone. In the absence of Pt, molybdena alone on this alumina base is only able to reach the 95 octane level at a reduced feed rate, with high carbon production, and neither the molybdena alone or platinum shows the high octane and low coke which can be obtained with the two together. At the same time, this promotional effect is limited to very low $MoO_3$ concentrations. It disappears entirely when the amount of molybdena approaches that which is commonly employed in the preparation of active hydroforming catalysts. Thus, the catalyst containing 0.5% platinum together with 9% of molybdena is very little better than the alumina base catalyst alone. In this case the high liquid yield and low amount of feed degradation to coke are no better, however, than those corresponding to a very much higher degree of octane improvement when using the preferred catalysts of the present invention.

A further study of these data shows that the promotional effect of these small amounts of the hydrogenation promoter which is apparent for product quality holds also for catalyst activity and selectivity. Standard correlations may be made comparing the gasoline yield and carbon production at each octane level with a base point for the 52 O. N. feed at 100% yield and zero carbon production. On this basis, using an octane scale which is linear with compression ratio, the yield at a given octane is higher and the carbon make lower for the 0.03 and 0.10% molybdena promoted catalysts than for the 0.5% platinum alone. The 0.5% molybdena catalyst is fully equivalent to the control, with a marked improvement in activity amounting to a gain of 2.5 points in octane and no loss in selectivity to coke. It should be kept in mind that this gain in product quality is at a premium quality level, where any improvement whatever is difficult to obtain.

These results are superior to any which could be predicted on the basis of previous experience. The same correlations show that the results obtained when the catalyst has 2.5% molybdena together with the platinum are distinctly inferior to those with platinum alone, or platinum promoted with very small amounts of molybdena. On either the yield-octane or carbon-octane basis, the 2.5% molybdena catalyst is precisely in line with the 9.0% molybdena-0.5% Pt, showing poor results and no promotional effect whatever. The advantage of the molybdena promoter has disappeared entirely at the 2.5% concentration level, which is well below the 6% minimum at which molybdena on alumina is ordinarily considered to be an effective hydroforming catalyst.

The data on carbon production are particularly interesting, and the low carbon production at a high activity level is an outstanding advantage of the catalysts of the present invention. This is a matter of real commercial significance, since such catalysts may be used for longer periods of time without loss in activity or selectivity due to carbon fouling.

Without being limited to any theory of action for the phenomena observed, it appears that the platinum and the alumina in the catalysts of the present invention cooperate to give a product whose quality is improved by the small amount of hydrocarbon activation which is promoted by the presence of only a very small quantity of the third component hydrogenation catalyst. Hydrogenation promoters or catalysts which may be used in this way include the oxides or sulfides of Mo, Sn, W, Ni, Sr, Ti, Zr, Sb, Co or mixtures thereof such as cobalt molybdate, nickel sulfide-tungsten sulfide and the like. The ability to employ these catalyst in the form of the sulfides may be important in connection with the fact that the noble metal catalysts such as those containing small amounts of platinum on alumina, are found to be surprisingly insensitive to the sulfur poisoning which characterizes group VIII metal catalysts when the metal is present in substantially larger amounts. In cases where sulfur-containing feed stocks are to be treated, preferred materials for the third components of the catalyst of the present invention include the sulfides of molybdenum, tin, tungsten or nickel.

In any case, these materials are included in strictly limited and small amounts, so as to avoid undesirable changes in the activity-selectivity characteristics of the platinum-alumina catalysts. For example, in catalyst containing 0.05 to 2.0% of a noble metal on alumina, a promoter chosen from the above class of compounds may be useful in amounts ranging from about 0.01% to 2.5% or not over 5 wt. percent. For each case, also, the promotional effect herein described and claimed is limited to promoter concentrations definitely below the minimum level at which the promoter itself is considered to be an effective hydroforming catalyst.

These materials may be incorporated into the catalyst by impregnation or precipitation methods. Alternatively, the platinum and promoter may be added first to a portion of the carrier to form a promoted platinum concentrate which is then diluted with the remaining support to give a final catalyst of the desired overall composition. In this instance the hydrogenation promoter may be added to the platinum concentrate or diluent fraction of the carrier or to both.

Catalysts of the type described herein may be prepared on a variety of supporting materials in which alumina is a major constituent. Modified supports of this general class may include alumina stabilized or modified by the addition of silica, boria, zirconia, titania, zinc oxide and the like.

The presence of a hydrogenation promoter in these catalysts is also found to be of material assistance in promoting the regeneration of carbonized catalysts by a simple hydrogenation treatment, as required, to restore the activity of the spent catalyst. The preferred conditions for this hydrogen regeneration depend somewhat upon the type of operation. For either fixed bed or fluid bed operation, some advantage may be found in carrying out the regeneration at reaction temperature or at a somewhat higher temperature within the broad range of about 900 to 1300° F. The regeneration pressure employed may be varied between atmospheric and 1000 p. s. i. g., although it is ordinarily at or somewhat above the operating pressure of the hydroforming process. The hydrogen rate is ordinarily the same as that used during the on-stream portion of the operating cycle, although higher gas rates in the broad range equivalent to about 2000 to 10,000 standard cubic feet per barrel of oil feed rate may be employed. The same hydrogen-containing gas recycled from the hydroforming stage will normally be used, with a hydrogen concentration of from about 50 to 99 mol percent diluted with smaller amounts of methane, ethane and propane. The temperature of this gas stream may be increased to supply heat during the regeneration process, and the catalyst may be heated at the same time by indirect heat exchange or by other suitable means, if desired.

The ability of these catalysts to be regenerated this way by hydrogenation gives long catalyst life, without the deactivation which ordinarily accompanies air regeneration. Conversely, the promotional effect is found in certain cases to increase the sensitivity of these catalysts to being deactivated by oxidation, and in such cases it becomes important to maintain the catalyst in a reducing atmosphere at all times after it is first placed on stream.

What is claimed is:
1. A catalyst for hydrocarbon conversion processes which consists essentially of 0.1 to 1% by weight of metallic platinum finely dispersed on an alumina carrier, promoted by the addition of less than 0.5% by weight of molybdic oxide said amount of molybdic oxide being below the minimum at which the oxide itself forms an effective conversion catalyst with said alumina in the absence of said platinum.

2. A catalyst for naphtha hydroforming which consists essentially of from about 0.3 to 1% by weight of metallic platinum, supported on an active alumina-containing carrier promoted by the addition of from 0.01 to at most 0.5% by weight, of molybdic oxide.

References Cited in the file of this patent

UNITED STATES PATENTS

| | | |
|---|---|---|
| 2,288,336 | Welty | June 30, 1942 |
| 2,317,683 | Greensfelder | Apr. 27, 1943 |
| 2,441,297 | Stirton | May 11, 1948 |
| 2,472,844 | Munday et al. | June 14, 1949 |
| 2,479,110 | Haensel | Aug. 16, 1949 |

FOREIGN PATENTS

| | | |
|---|---|---|
| 577,008 | Great Britain | May 1, 1946 |